United States Patent [19]
Martin

[11] Patent Number: 5,665,920
[45] Date of Patent: Sep. 9, 1997

[54] DEVICE WITH EXCHANGEABLE SEALING ELEMENT FOR MEASURING PRESSURE OR DIFFERENTIAL PRESSURE

[75] Inventor: Rainer Martin, Efringen-Kirchen, Germany

[73] Assignee: Endress + Hauser GmbH + Co., Maulburg, Germany

[21] Appl. No.: 584,055

[22] Filed: Jan. 11, 1996

[30] Foreign Application Priority Data

Jan. 12, 1995 [EP] European Pat. Off. ............ 95100337

[51] Int. Cl.⁶ .................. G01L 7/08; G01L 9/00
[52] U.S. Cl. .................. 73/715; 73/723
[58] Field of Search ............. 73/756, 724, 718, 73/715, 716, 717

[56] References Cited

U.S. PATENT DOCUMENTS

| | | | |
|---|---|---|---|
| 3,365,949 | 1/1968 | Robinson | 73/715 |
| 5,090,237 | 2/1992 | Schrumph et al. | 73/756 X |
| 5,499,539 | 3/1996 | Glienke et al. | 73/756 |
| 5,535,629 | 7/1996 | Gerdes et al. | |

FOREIGN PATENT DOCUMENTS

| | | |
|---|---|---|
| 3344799 A1 | 6/1985 | Germany. |
| 4234290 A1 | 4/1994 | Germany. |
| WO93/22646 | 11/1993 | WIPO. |

Primary Examiner—George M. Dombroske
Assistant Examiner—Joseph L. Felber
Attorney, Agent, or Firm—Bose McKinney & Evans

[57] ABSTRACT

For measuring pressure or differential pressure, in particular for highly viscous and/or glutinous foodstuffs, provision is made for a device which exhibits a ceramic pressure sensor (1), a housing (2) and a connection element (3) which is connected releasably to the housing (2) and is intended for fastening the device on a wall (6) of a container which contains a measuring medium. Furthermore, two sealing elements (4, 9) which engage around one another coaxially are provided: an outer sealing element (4) which is located between the housing (2) and the pressure sensor (1), on the side facing the measuring medium, and an inner, exchangeable sealing element (9) which is arranged between the pressure sensor (1) and the connection element (3).

10 Claims, 1 Drawing Sheet

DEVICE WITH EXCHANGEABLE SEALING ELEMENT FOR MEASURING PRESSURE OR DIFFERENTIAL PRESSURE

FIELD OF THE INVENTION

The invention relates to a device for measuring pressure or differential pressure, having a ceramic pressure sensor.

DESCRIPTION OF THE PRIOR ART

DE-A 42 34 290 describes a device for measuring pressure having a rotationally symmetrical ceramic pressure sensor, having a rotationally symmetrical housing which exhibits an axial bore, the diameter of which bore decreases in the direction of the front side facing the measuring medium, and having a single sealing element which is inserted, flush at the front, between the housing and the outer surface of the pressure sensor.

A disadvantage of such a device is that the sealing element, which is constantly in contact with the measuring medium, cannot be exchanged without the pressure sensor having to be removed from the housing. After the sealing element is exchanged, the device has to be recalibrated.

However, this exchanging operation is necessary not only for replacement purposes, but also for cleaning, in particular when the device is used in the food industry. This is because the sealing elements installed in the manner described above form potential bacteria traps there.

Furthermore, DE-A 42 13 857 describes a device for measuring pressure or differential pressure, having a ceramic pressure sensor, a housing, a connection element which is connected releasably to the housing and is intended for fastening the device on a wall of a container which contains a measuring medium, the connection element exhibiting a narrow, axial inner bore which has the function of a diaphragm seal and by way of which the pressure sensor is in contact with the measuring medium, and having an exchangeable sealing element which is inserted between the housing, connection element and pressure sensor, on the side facing the measuring medium, and is clamped in with a defined force by the connection element being screwed against a stop.

A device of this type, however, is not suitable for highly viscous and/or glutinous media, since such media block the axial inner bore of the connection element and thus impair the pressure transmission.

OBJECTS AND SUMMARY OF THE INVENTION

It is an object of the invention to provide a device for measuring pressure or differential pressure, which is suitable, in particular, for highly viscous and/or glutinous foodstuffs and can be easily cleaned without the electrical properties being impaired.

For this purpose, the invention comprises a device for measuring pressure or differential pressure, having a ceramic pressure sensor, a housing, a connection element which is connected releasably to the housing and is intended for fastening the device on a wall of a container which contains a measuring medium, an outer sealing element which is inserted between housing and pressure sensor, on the side facing the measuring medium, and an exchangeable inner sealing element which is arranged between the pressure sensor and connection element, which sealing elements engage around one another coaxially.

According to an advantageous configuration of the invention, the pressure sensor exhibits a pressure-sensitive diaphragm, and the housing and the connection element are each provided with a central opening through which the pressure diaphragm is in contact with the measuring medium.

According to an advantageous development of the invention, on its side facing the measuring medium, the housing terminates with a securing ring which projects into the housing interior and exhibits a groove for receiving the outer sealing element, the pressure sensor being pressed against the outer sealing element.

According to a further advantageous configuration, the connection element engages around the housing on the side facing the measuring medium and presses the inner sealing element against a pressure-insensitive border of the pressure sensor, the inner sealing element resting against the connection element on the side facing the measuring medium, resting against the pressure sensor on the side remote from the measuring medium, and resting against the housing on the outer side, and being in contact with the measuring medium on the inner side.

A further advantageous configuration of the invention consists in the fact that the measuring medium is not in contact with the housing.

According to a further advantageous configuration of the invention, the housing is connected to the connection element in a pressure-tight manner via the outer sealing element, and the housing and the connection element are screwed to one another.

Furthermore, the connection element may be connected releasably to the wall of the container in a pressure-tight manner and may consist of a material which is resistant to the measuring medium, preferably of Hastelloy, titanium, tantalum, Monel, nickel or Inconel.

One advantage of the invention consists in the fact that the device exhibits a largely planar front surface, and there are no constrictions through which the measuring medium is directed.

A further advantage of the invention consists in the fact that the device makes it possible for the sealing element which is in contact with the measuring medium to be exchanged without recalibration of the device being necessary and without there being any need for components which have the function of diaphragm seals.

A further advantage of the invention is that, by virtue of the releasably connected connecting element, the device can be used as a universal component for a large number of process connections, and that it is possible to avoid expensive stock keeping with a large number of exchangeable parts which are necessary on account of hygiene regulations and/or due to heavy soiling.

The invention and further advantages will now be explained in more detail with reference to the drawings, in which an exemplary embodiment is represented and:

DETAILED DESCRIPTION OF THE INVENTION

Figure 1:
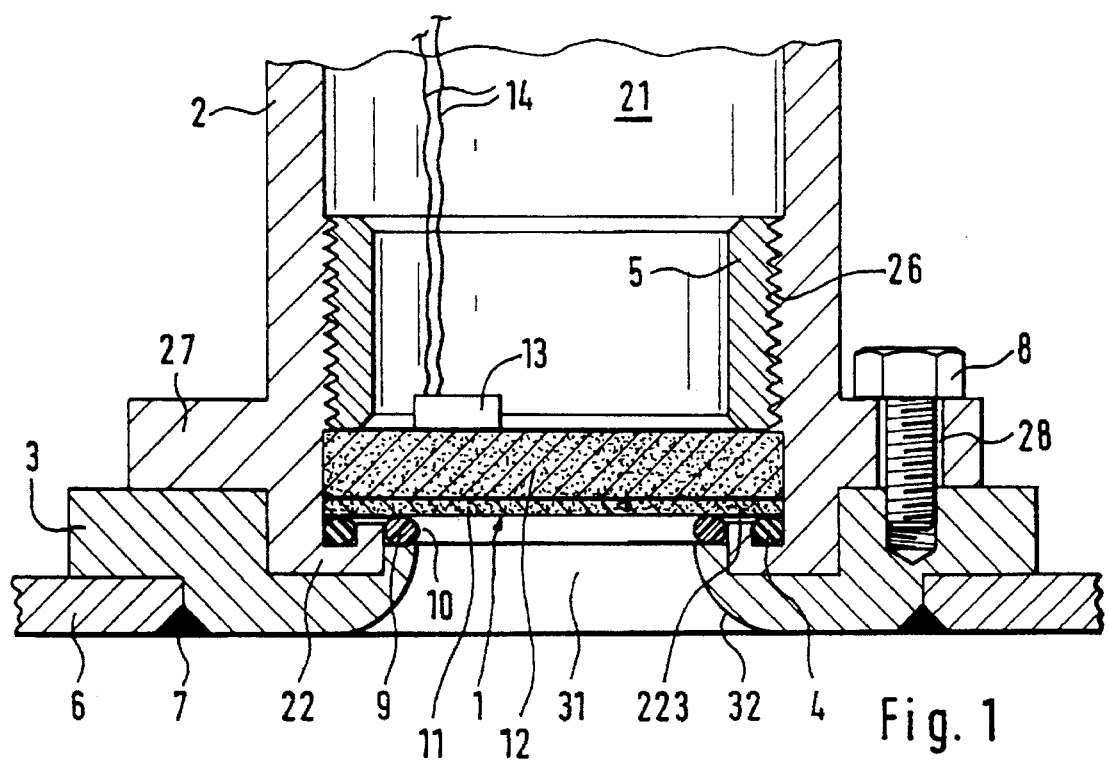
FIG. 1 shows a longitudinal section through a device according to the invention.

In FIG. 1, the device for measuring pressure or differential pressure comprises three main elements: a pressure sensor 1, a housing 2 and a connection element 3 which is connected releasably to the housing. Said connection element serves to fasten the device on a wall 6 of a container which contains a measuring medium. An outer sealing element 4 is located between the housing 2 and the pressure sensor 1, on the side facing the measuring medium. An exchangeable inner sealing element 9 is located between the pressure sensor 1 and the connection element 3. The two sealing elements 4, 9 engage around one another coaxially.

The pressure sensor 1 is, for example, a conventional capacitive cylindrical pressure measuring cell which comprises a diaphragm 11 and a substrate 12, these being held at a defined distance apart from one another by a bonding material, e.g. an active brazing material, and being connected to one another in a hermetically sealed manner. The inner surfaces of the diaphragm 11 and of the substrate 12, which inner surfaces are coated with electrode material, form at least one measuring capacitor, the capacitance of which depends on the bending of the diaphragm 11 and is thus a measure of the pressure acting on the diaphragm 11.

The diaphragm 11 may consist of ceramic, oxide ceramic, quartz, sapphire or a crystalline material. The substrate 12 preferably consists of a material which is very similar to the material of the diaphragm 11, or at least has a comparable thermal expansion coefficient.

On the side remote from the measuring medium, the pressure measuring cell exhibits an electronic circuit 13, which converts the capacitance of the measuring capacitor into a pressure-dependent electric signal and makes it available, via electrical connection lines 14, for further processing and/or display.

However, other types of pressure sensors, e.g. pressure sensors which work with strain gauges, may also be used for the invention.

The pressure sensor 1 is introduced into the rotationally symmetrical housing 2 such that the pressure-sensitive diaphragm 11 faces the measuring medium. The electrical connection lines 14 run in the housing interior, on the rear side, remote from the measuring medium, of the pressure sensor 1.

Figure 2:
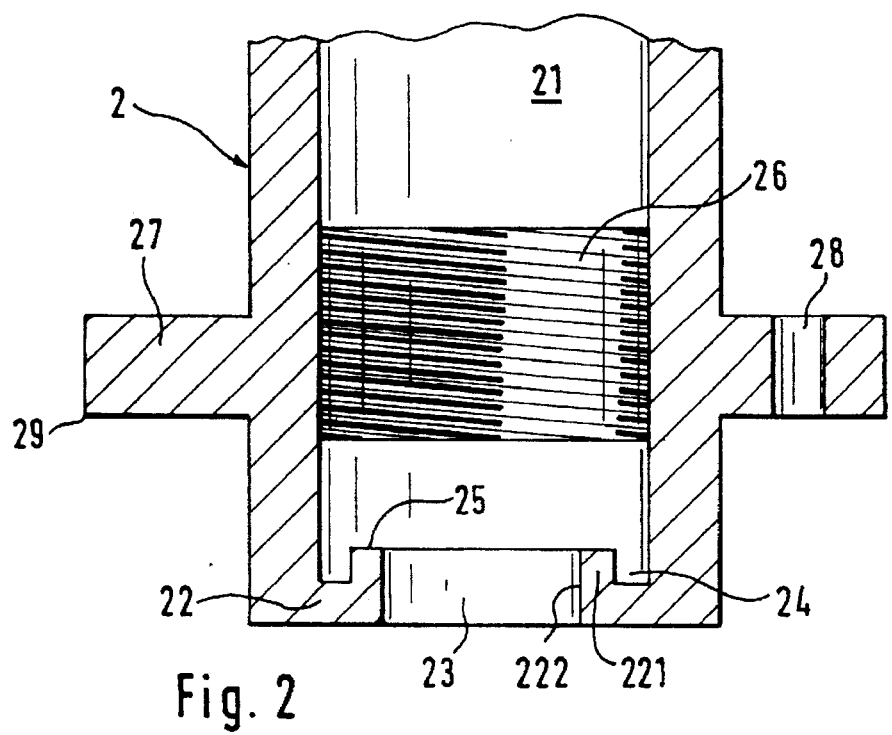
FIG. 2 shows a longitudinal section through the housing represented in FIG. 1.

FIG. 2 shows the housing 2 as an individual part. The internal diameter of a cylindrical interior 21 of the housing 2 is constant and corresponds to the external diameter of the pressure sensor 1. The housing 2 and the connection element 3 each exhibit a central opening 23, 31 through which the diaphragm 11 is in contact with the measuring medium. The central opening 31 of the connection element 3 is designed such that virtually the entire diaphragm 11 of the pressure sensor 1 is in connection with the measuring medium. This ensures good utilization of the sensitivity of the pressure sensor 1 and also means that the device is easy to clean.

The cross-sectional surface area of the opening 31 increases in the direction of the side facing the measuring medium since the border of the opening 31 describes a quarter-circle 32 in longitudinal section, see FIG. 1. That surface of the connection element 3 which faces the measuring medium is in alignment with the container wall 6. The connection element 3 extends in front of the border region of the pressure sensor 1 only as far as is necessary for fastening the inner sealing element 9. Due to this design of the connection element 3, in which it is virtually flush at the front with the pressure sensor 1, the device lends itself well to cleaning.

On the side facing the measuring medium, the housing 2 is designed as a securing ring 22 which extends radially into the interior 21 of the housing 2 and has an annular-cylindrical collar 221. The diameter of the central, circular opening 23 of the housing 2 is equal to the internal diameter of the annular-cylindrical collar 221 of the securing ring 22.

In the interior 21 of the housing 2, on the side facing the pressure sensor, the securing ring 22 exhibits a groove 24 of, for example, rectangular cross section, the external diameter of which groove corresponds to the diameter of the interior 21. The outer sealing element 4 is located in said groove 24. Said sealing element is, for example, an O-ring consisting of an elastomer and has the function of protecting the electronic circuit 13, arranged on the rear side of the pressure sensor 1, against soiling and/or moisture.

The diaphragm 11 rests with its outer border on the housing seal 4 located in the groove 24. There is a narrow gap 223 between the diaphragm 11 and a shoulder 25 of the collar 221. On the side remote from the measuring medium, a threaded ring 5 which has an external thread and is screwed into an internal thread 26 of the interior 21 of the housing 2 presses the pressure sensor 1 against the securing ring 22 and the outer sealing element 4, with the result that the pressure sensor 1 rests there in a pressure-tight manner. The outer sealing element 4 cannot be exchanged.

This arrangement has the advantage that the pressure-sensor characteristic curve is constant over large temperature ranges since the pressure sensor i is clamped in in a defined manner. In this form, comprising a pressure sensor 1, housing 2, outer sealing element 4, threaded ring 5, electronic circuit 13 and the electrical connection lines 14, a pressure-measuring device which is inherently fully functional is already provided.

For fixing the inner sealing element 9, the connection element 3 engages around the collar 221 of the securing ring 22 such that, in the border region of the pressure sensor 1, there is a gap 10 between the pressure diaphragm 11 and connection element 3. The sealing element 9 rests against the connection element 3 on the side facing the measuring medium, rests against the pressure sensor i on the side remote from the measuring medium and rests against the housing 2 on the outer side. The sealing element 9 is in contact with the measuring medium on the inner side. The sealing element 9 consists of a material which is resistant to the measuring medium. Depending on the medium, this is, for example a VITRON (a synthetic rubber composition) O-ring, a KALREZ seal or a (a synthetic rubber composition) seal sheathed in polytetrafluoroethylene. The housing 2 is not in contact with the measuring medium. On the outer side and on the front side, facing the measuring medium, of the housing 2, the connection element 3 fully encloses the securing ring 22.

For pressure-tight, releasable fastening of the connection element 3 on the housing 2, the latter exhibits, level with that surface of the pressure sensor 1 which is remote from the measuring medium, an offset ring 27 having at least two bores 28, by way of which the housing 2 is connected to the connecting element 3 by means of screws 8. Consequently, the housing 2 rests, with the offset ring 27, in a sealed manner on the connection element 3, and the latter, at the lower housing border, rests in a sealed manner on the securing ring 22, on the side opposite the groove 24. This ensures that the gap 10, in which the inner sealing element 9 is located, always has the same dimensions and that the inner sealing element 9 is exposed to the same contact-pressure force in each installation.

Apart from the pressure-sensitive diaphragm 11 of the pressure sensor 1, the connection element 3 and the inner sealing element 9 are the only constituent parts of the device which come into contact with the measuring medium. It is only these two parts which therefore have to be resistant to the measuring medium. In the case of particularly aggressive measuring media, the material of the connection element 3 is a cost-intensive special material, e.g. titanium, tantalum, nickel, MONEL (a corrosion resistant nickel alloy), INCONEL (a corrosion resistant nickel alloy), or HASTELLOY, (a corrosion resistant nickel alloy). In contrast, the material of the housing 2 may be a comparatively cost-effective standard material, e.g. aluminum or steel.

The connection element 3 is fastened on the container wall 6 by means of a process connection 7. In FIG. 1, the process connection 7 is only shown schematically. While the inner geometry of the connection element 3 is identical for all applications, there are a large number of variants for the outer geometry of the connection element 3, for example the design as a flange which is screwed to a mating flange at the measuring location, the design as an external thread which is screwed into a corresponding opening, or the design as a swivel part which is welded into a container opening 6. Further releasable or non-releasable process connections 7 are known to the person skilled in the art.

The connection element 3 thus fulfills two tasks. On the one hand, it ensures that the sealing element 9 is clamped in in a reproducible manner, i.e. such that the pressure-sensor characteristic curve does not change, and, on the other hand, it has the function of an adaptor, by means of which the actual pressure-sensor arrangement, i.e. the pressure sensor 1, the housing 2, the outer sealing element 4, the threaded ring 5, the electronic circuit 13 and the electrical connection lines 14, is fastened as a universal component onto one of a large number of possible process connections on the container wall 6.

I claim:

1. A device for measuring pressure or differential pressure of a measuring medium in a container, having
    a ceramic pressure sensor (1) having a side facing the measuring medium,
    a housing (2) containing the pressure sensor (1),
    a connection element (3) which is connected releasably to the housing (2) and is intended for fastening the device on a wall (6) of the container which contains the measuring medium,
    an outer sealing element (4) which is inserted between the housing (2) and pressure sensor (1) and
    an exchangeable inner sealing element (9) which is inserted between the pressure sensor (1) and connection element (3), the inner sealing element engages the pressure sensor (1) on the side of the pressure sensor (1) facing the measuring medium;
    the sealing elements are arranged coaxially with the outer sealing element (4) having a larger diameter than the inner sealing element (4).

2. The device as claimed in claim 1, wherein the pressure sensor includes a pressure-sensitive diaphragm (11), and wherein the housing (2) and the connection element (3) each has a central opening (23, 31) through which the pressure-sensitive diaphragm (11) is in contact with the measuring medium.

3. The device as claimed in claim 1, in the case of which
    the housing (2) terminates with a securing ring (22) which projects into the housing interior,
    the securing ring (22) forms a groove (24) for receiving the outer sealing element (4), and
    the pressure sensor (1) is pressed against the outer sealing element (4).

4. The device as claimed in claim 1, in the case of which the connecting element (3)
    engages the housing (2) and
    presses the inner sealing element (9) against a pressure-insensitive border of the pressure sensor,
    the inner sealing element (9)
    rests against the connection element (3),
    rests against the pressure sensor,
    rests against the housing (2), and
    is in contact with the measuring medium.

5. The device as claimed in claim 1, in the case of which the measuring medium is not in contact with the housing (2).

6. The device as claimed in claim 1, in the case of which the housing (2) is connected to the connection element (3) and the inner sealing element (9), provides a pressure-tight seal between the connection element (3) and the pressure sensor (1).

7. The device as claimed in claim 1, in the case of which the housing (2) and connection element (3) are screwed to one another.

8. The device as claimed in claim 1, in the case of which the connection element (3) is connected releasably to the wall (6) of the container in a pressure-tight manner.

9. The device as claimed in claim 1, in the case of which the connection element (3) consists of a material which is resistant to the measuring medium.

10. The device as claimed in claim 5, in the case of which the connection element (3) is made of a material selected from the group consisting of, titanium, tantalum, nickel and a nickel alloy.

* * * * *